United States Patent [19]

Negroni

[11] Patent Number: 5,415,347
[45] Date of Patent: May 16, 1995

[54] AUTOMATIC REFILLING PLANT WATERING DEVICE

[75] Inventor: Pietro Negroni, Pianoro, Italy

[73] Assignee: G.F. S.r.l., Correggio, Italy

[21] Appl. No.: 233,045

[22] Filed: Apr. 25, 1994

[30] Foreign Application Priority Data

Apr. 27, 1993 [IT] Italy .................. BO93U0093

[51] Int. Cl.⁶ .................. B05B 12/02; B05B 15/02; A01G 27/00
[52] U.S. Cl. ........................ 239/65; 239/68; 239/114; 239/548; 239/71; 222/650; 47/79
[58] Field of Search ............ 47/48.5 R, 79; 239/63, 239/65, 67, 68, 71, 99, 101, 114, 274, 548; 222/51, 52, 56, 166, 463, 650

[56] References Cited

U.S. PATENT DOCUMENTS

| | | | |
|---|---|---|---|
| 1,670,164 | 5/1928 | Pfahl | 47/79 X |
| 3,168,224 | 2/1965 | Rios | 47/79 X |
| 3,542,069 | 11/1970 | Ollison | 47/79 X |
| 3,900,134 | 8/1975 | Larson | 239/65 X |
| 4,006,843 | 2/1977 | Martinez | 47/79 X |
| 4,042,150 | 8/1977 | Roos | 47/79 X |
| 4,157,770 | 6/1979 | Roos | 222/650 |
| 4,676,023 | 6/1987 | Mori | 47/79 X |

FOREIGN PATENT DOCUMENTS

| | | | |
|---|---|---|---|
| 201922 | 2/1959 | Austria | 47/79 |
| 1234704 | 5/1992 | Italy . | |
| 86675 | 12/1955 | Norway | 47/79 |
| 116795 | 7/1944 | Sweden | 47/79 |
| 940708 | 7/1982 | U.S.S.R. | 239/67 |

*Primary Examiner*—Andres Kashnikow
*Assistant Examiner*—Lesley D. Morris
*Attorney, Agent, or Firm*—Darby & Darby

[57] ABSTRACT

A container and distributor of water is internally provided with a bath pivoted in such a way as to empty when full. A floating piston situated inside a chamber enables water delivery to the bath at a rate regulated by varying a water head in the chamber, and an outlet opening from the chamber conducts water into the bath. A rod, insertable in the outlet opening and movable upon pivoting of the bath, prevents a build-up of residues in the outlet due to impurities in the water such that the outlet opening does not become blocked or obstructed.

14 Claims, 5 Drawing Sheets

Automatic Refilling Plant Watering Device

BACKGROUND OF THE INVENTION

Many controlled and continuous irrigation devices are well-known, particularly for vases of flowers or plants situated on balconies or terraces. These are utilized especially during holiday periods, or at other times when the homeowner may be away.

Most of the examples in the prior art are electronic devices, essentially having an electronic programmer connected to a running water supply through an open tap and having at its output a series of hoses arranged such as to reach the plants which have to be watered. The programmer sets the watering modalities by programming a timer and the device acts on a valve connected to the tap and regulates the flow of water from the supply to the hoses. The user sets a series of buttons and/or knobs provided on the programmer and has only to select the irrigation program he or she wants, and the program does the rest: watering time, duration of watering operation, day of watering, and so on.

Such devices, however, present some drawbacks, one of which being that the device itself is dependent on an electrical supply, so that the water supply cannot be turned off, which the user usually prefers to do when leaving his or her dwelling for a long time period.

A further drawback is that the tap has to be left open, and if, during the user's absence, the device should become faulty, there might ensue a constant and very damaging flow of water into the room housing the device.

A still further drawback is the high cost of these devices, in relation to their occasional use, which is usually only on the occasions when the user leaves his or her house for a long period of time.

The present applicant addressed the above problems in the device disclosed in patent IT 1,234,704, which has a water container and distributor provided at its base with a plurality of outlet holes for the water and an open bath to receive said water. The bath is housed internally of the container and is pivoted on the container at a horizontal axis corresponding to its center of gravity (calculated when the bath is full). A valve is provided which acts on a supply pipeline of water to the bath to control the water supply to the bath. The device further comprises a counterweight to maintain the bath in a water-receiving position and to bring the bath back into the same position after it has emptied itself into the container by rotating on its axis.

The above solution adequately solves the problem of providing a constant but small quantity of water so as to avoid overflow risks, but has drawbacks deriving from impurities contained in the irrigating water. Where the salt (especially calcium) content of mains water is high, residues form about the tap and cause a diminution, or at least variations, in the water delivery rate.

SUMMARY OF THE INVENTION

The principal aim of the present invention is to obviate the above-described drawbacks by providing an irrigation device including a bath for controlled distribution of water over a length of time, and further provided with means for providing water from the tank. The device also serves to prevent any blocking of the tap due to impurities in the water.

The invention provides a reliable irrigation device that has no need of electric or water supplies, and which supplies water to the plants notwithstanding any impurities in the water.

BRIEF DESCRIPTION OF THE DRAWINGS

Further characteristics and advantages of the present invention will become more apparent from the detailed description that follows, of an embodiment of the invention, illustrated in the form of a non-limiting example in the accompanying drawings, in which.

DESCRIPTION OF THE PREFERRED EMBODIMENTS

With reference to the Figures, the device principally comprises two elements: a container and distributor 1 of water and at least one open-topped bath 3 (FIGS. 2 and 6) for receiving the water, which bath 3 is housed internally of the container 1 and pivoted to it.

As can be seen in the embodiment of FIGS. 2, 3, 4 and 5, the container 1 is box-shaped and has in its base 1a a plurality of water outlet holes 2, while the bath 3 has a truncopyramidal shape and is arranged internally of the container 1 with its open side 3a (being the larger base of the truncopyramid) upturned and opposite to the container base 1a.

The bath 3 is pivoted, as will be described in more detail hereinbelow, on the container 1 on its horizontal center of gravity, denoted by X, which is calculated to correspond to a point were the water level is just below the rim of the bath 3.

A regulator 4 for regulating the water delivery is connected to a water supply pipe 5 (preferably connected to a tank 12 or, in any case, to a low-pressure water source).

Figure 1:
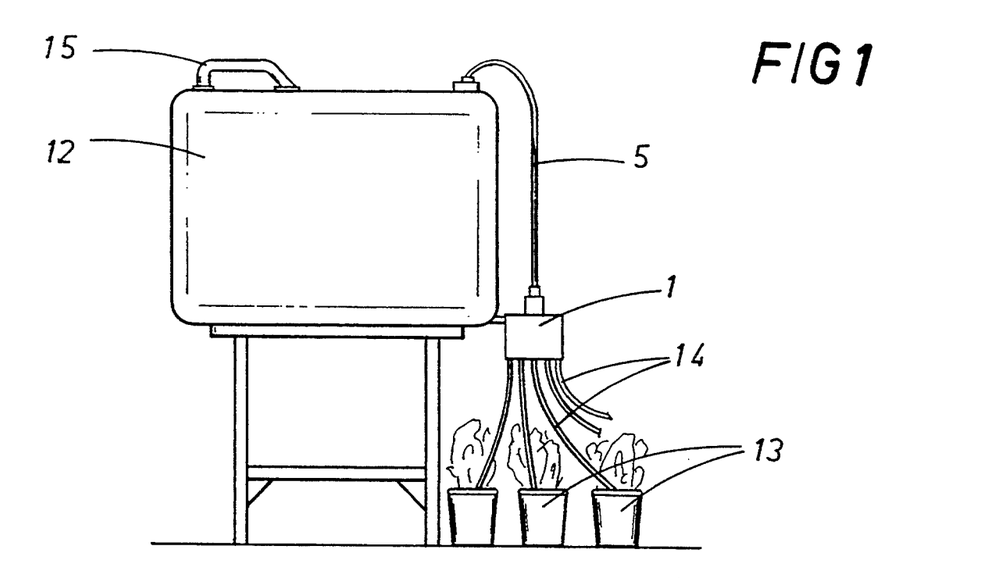
FIG. 1 is a schematic illustration of the device in a working configuration.

As illustrated in FIG. 1, the water is supplied to container 1 from a portable tank 12 provided with a handle 15 and positioned above the water outlet.

The water delivery regulator (FIGS. 2 and 2A) includes a chamber 41 having a horizontal cross-section of constant dimension and is mounted to the top of container 1. Chamber 41 has an inlet cover 51 on its top with an opening 42 through which the water supply pipe 5 passes and an outlet opening 43 at its lower end into the bath 3.

Figures 2, 2A, 3, 4:
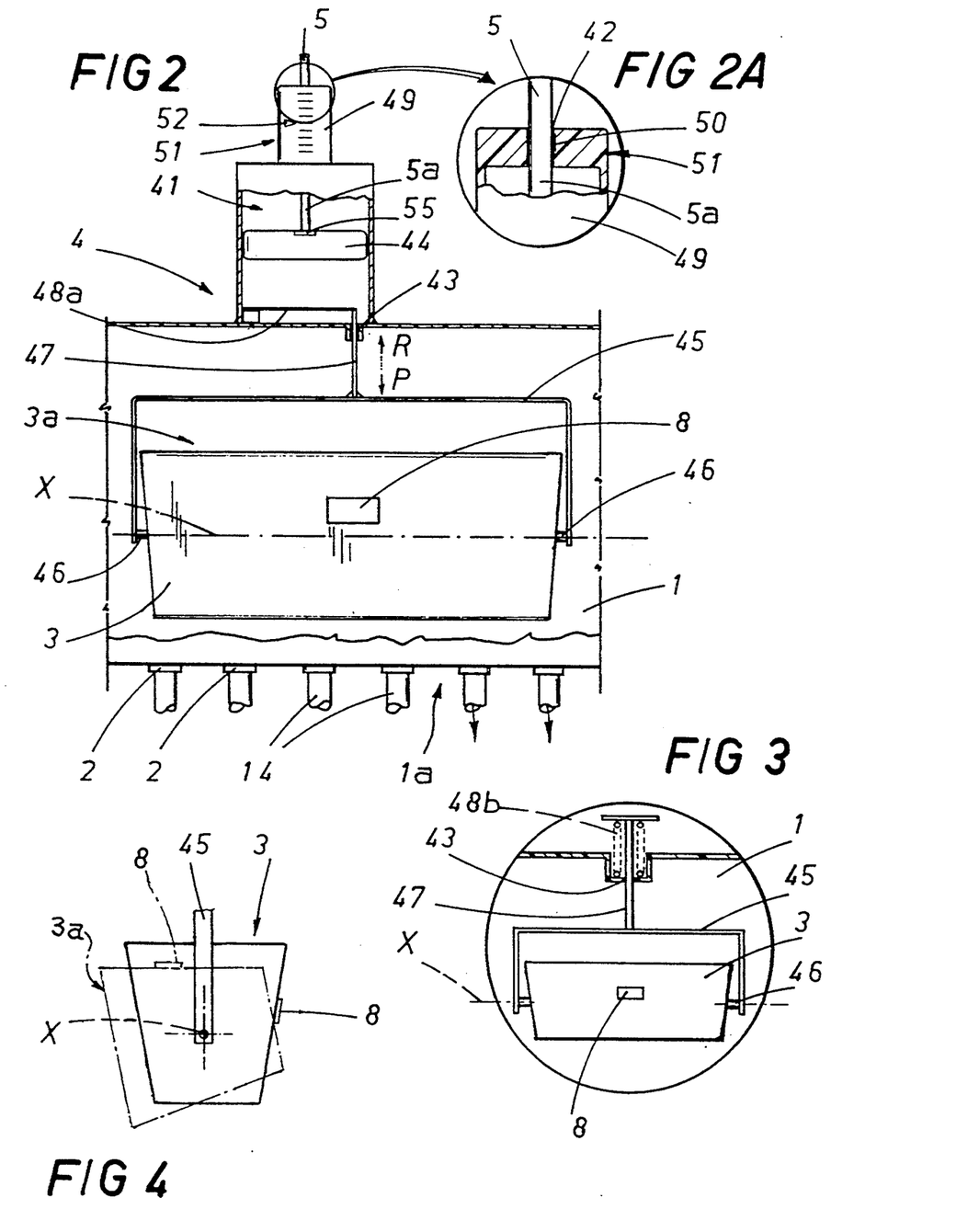
FIG. 2 is a lateral view of an embodiment of the invention with some parts removed to better show others.
FIG. 2A is an inset in enlarged scale showing means for positioning a water supply pipe.
FIG. 3 shows, with some parts removed to better show others, a detail of a further embodiment of the invention.
FIG. 4 shows a schematic illustration of the two limit positions of a bath, first during a filling phase and then in an emptying phase with the pouring position of the bath showing in darted lines.

The chamber 41 houses a floating piston 44 having a slightly smaller cross-section than that of the interior of the chamber 41. The floating piston 44 moves vertically within the chamber 41 and can be positioned at different heights between the inlet opening 42 and the outlet opening 43 in order to control variations in the water head and thus water delivery from the outlet opening 43.

To stably position the floating piston 44, the end 5a of the water supply pipe 5 within chamber 41 is a stiffened pipe (the pipe end 5a can be a second pipe stiffer than the water supply pipe 5). The pipe 5a has its open end turned downwards and forms a vertical stop to the thrust developing from the volume of water contained in the chamber on the floating piston 44.

At or near the inlet opening 42 of the chamber 41 are located means for fixing the pipe end 5a at different heights corresponding to any desired maximum height position for floating piston 44. FIG. 2A shows a preferred arrangement of the means for positioning the pipe end 5a, obtained by sliding the stiffened pipe end 5a through a like-shaped seating 50 at the top of the inlet cover 51. This provides sufficient friction to permit manual positioning of the pipe 5a, and consequently the floating piston 44, at a desired maximum height while at the same time not causing the pipe end 5a to be moved due to the force exerted on it by the water acting on the lower face of floating piston 44.

When the device is functioning, the water flows into the chamber 41 through the opening in the pipe end 5a until the floating piston 44, pushed upwards by the water, comes into contact with the stiffened pipe end 5a and blocks its opening. This prevents water exit from pipe end 5a until the water level in chamber 41 falls below the height corresponding to the contact between the floating piston 44 and the free end of the pipe end 5a.

A striker element 55 is preferably provided on piston 44 at the contact point with the pipe end 5a. The striker element 55 is made of an easily elastically deformable material to obtain a greater adhesion of the same to the edges of the opening of end 5a and better prevent water passage.

Inlet cover 51 has an external graduated scale 49. An indicator 52 is fixed to the pipe end 5a for indicating the different heights, and thus the different pressures, at which the water exits from the outlet opening 43.

The bath 3 is mounted to the container 1 at the outlet opening 43 of the chamber 41 by a fork 45. The fork 45 has support points 46 supporting the bath 3 at axis X and a vertical rod 47 having a smaller cross-section than the aperture of outlet opening 43 and is slidable inside the latter. The rod upper end is mounted by an elongated elastic member 48a to the top of container 1. The rod 47 and elastic member 48a provide vertical and opposite elastic reaction R to the weight force P exerted downwards by the bath 3 when full.

The bath 3, as in the aforementioned patent IT 1,234,704, receives the water while remaining stable and in its original position until the water reaches a point up to just below its rim. At this point the center of gravity axis X is reached, but once the above-mentioned level is surpassed, the natural center of gravity of the water-filled bath 3 changes, causing the bath 3 to rotate on its axis X and its side 3a to move into a position where it is facing the holes 2 (see FIG. 4, broken lines), whereat the water is poured from the bath into the container 1. Then the empty bath 3 returns into its original position, helped by a plate 8 mounted to a wall of the bath 3 acting as counterweight. The water channels into the holes 2 and thus into the pipes 14, whereby it is conducted to the vases 13 containing the plants to be watered.

Each time the bath 3 fills it moves downwards under the weight of the water before returning to a higher position than before once emptied. The water emptied into container 1 acts upwardly on the now empty bath. The rod 47 (preferably made of metal or a rigid plastic material) makes a vertical sliding movement within the outlet opening 43 of the chamber 41. This sliding movement removes residues from the outlet opening 43 and guarantees a constant water flow.

The device is programmed by varying the water delivery. This is done by altering the floating piston 44 level, using the graduated scale as a measure. By increasing the water head there will be a greater water outlet through the outlet opening 43. Once the water has flowed out of the outlet opening 43, it is collected in the bath 3 and distributed as described above.

To vary the frequency of the bath 3 tipping and emptying operations, the volume of the bath 3 can be changed. Alternatively, a second bath 3 can be provided, having a greater volume than the first and being directly pivoted on the container 1 below the bath 3, so as to empty at longer time intervals.

The elastic member 48a can be a flexible sheet of metal, as in FIG. 2, having one of its ends fixed to a point in the chamber 41 or the container 1 and its other end connected to the rod 47.

In a further embodiment, illustrated in FIG. 3, the elastic member is a spring 48b acting between the fork 45 and a fixed point on the chamber 41 or the container 1.

Figure 6:
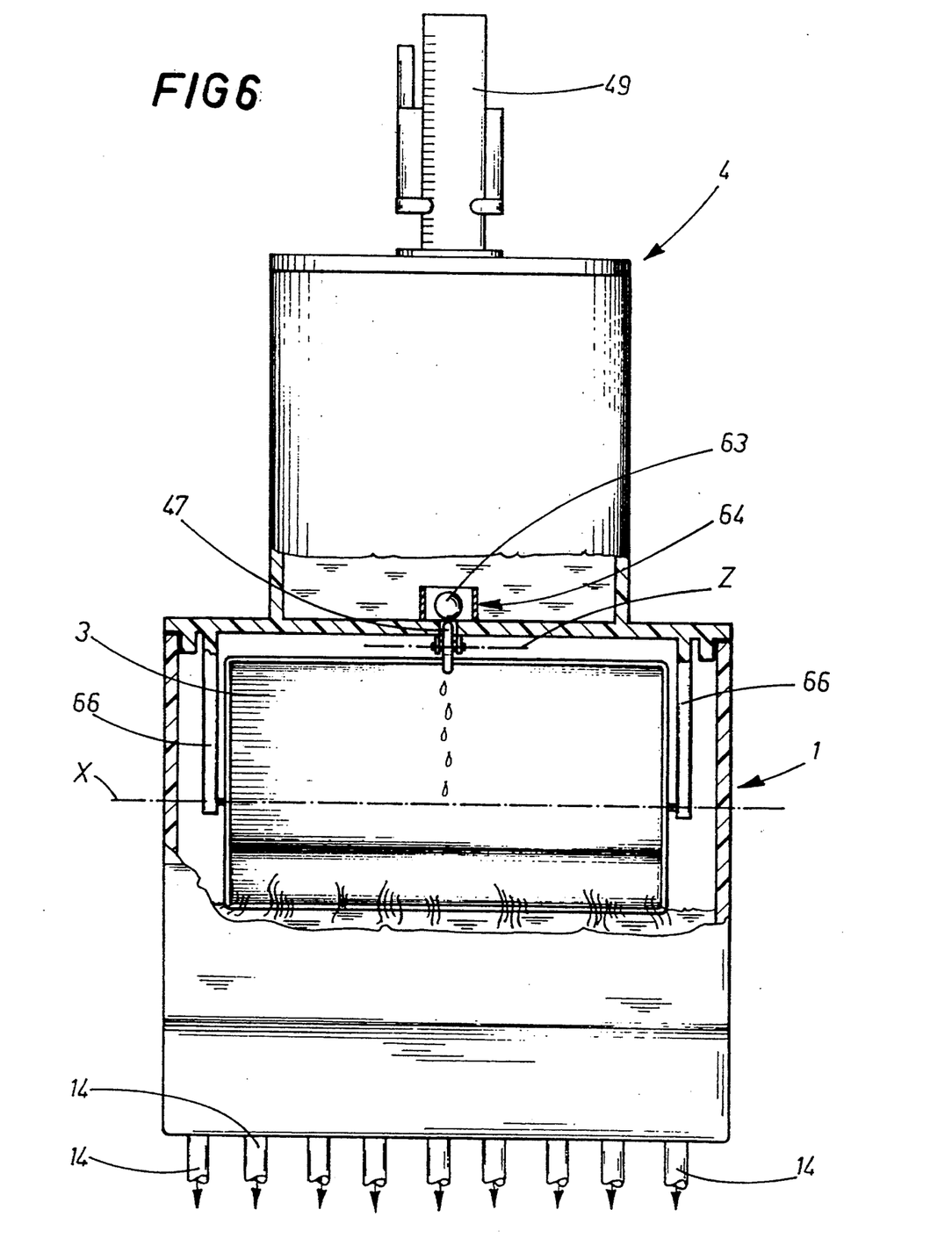
FIG. 6 shows a lateral view, again with some parts removed to better show others, of a further embodiment of the invention, showing a bath during an emptying phase.
Figure 7:
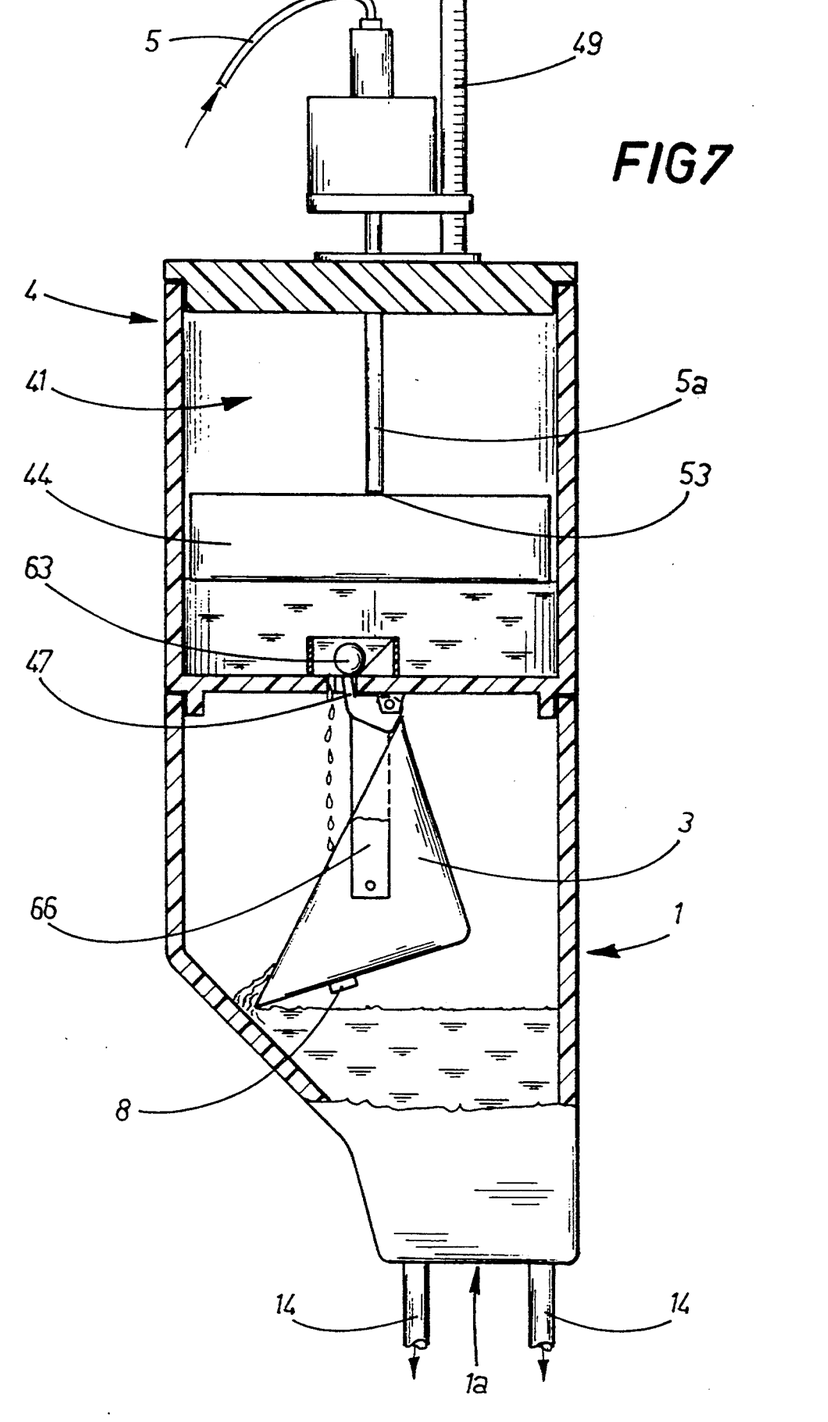
FIG. 7 is a frontal view, with some parts removed to better show others, of the embodiment of FIG. 6, showing a bath during an emptying phase.
Figures 8, 8A, 8B:
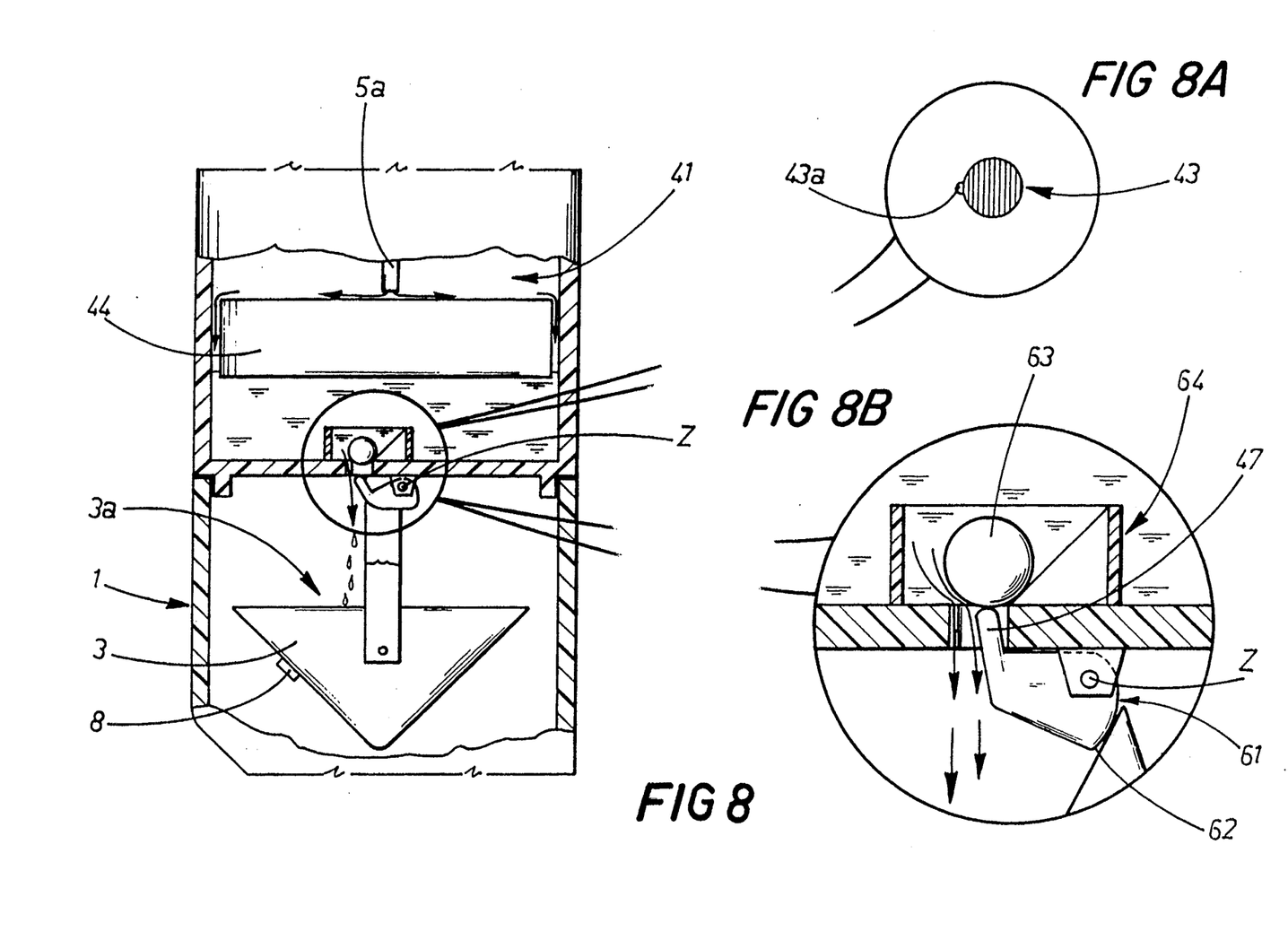
FIG. 8 is a partial frontal view, with some parts removed to better show others, of the embodiment of FIG. 6, showing a bath during a filling phase.
FIGS. 8A and 8B are details shown in enlarged scale, relating to an outlet hole in plan view from above and in a frontal view with some parts removed, during an emptying phase.

In the embodiment of FIGS. 6, 7 and 8, the bath 3 has a triangular prismatic shape and is pivoted to the container 1 by two fixed stirrups 66. The rod 47 is supported by a support 61 (FIG. 8) pivoted on an axis X integral with the container 1 or the chamber 41.

The support 61 has a striker portion 62, shown cam-shaped in the Figures, for the bath 3 which interacts with the bath 3 when the latter is rotated.

The support 61 is movable between a first position (shown in FIG. 8), in which it is subject to the force of its own weight and the rod 47 is outside of the outlet opening 43, and a second position (shown in FIGS. 6 and 7 and in the enlarged detail of FIG. 8) in which it is subject to a thrust by the rotated bath 3 and the rod 47 is at least partially inserted in the outlet opening 43. Thus the rod 47 is set in alternating motion by the fillings and emptyings of the bath 3.

FIG. 8 shows the outlet opening 43 provided with a circular opening forming a slot 43a. A seating 64 can be provided in the chamber 41 at the outlet opening 43 to receive (by effect of force of gravity) a ball check valve sphere 63 of heavier material than water and having a diameter which is larger than that of the circular portion of the outlet opening 43. When the rod 47 is inserted in the outlet opening 43 it cleans the opening and prevents the formation of residues. The rod 47 also moves the sphere 63 away from opening 43 and slot 43a and allows a greater flow of water to pass. In the Figures, the flow of water is indicated by un-numbered arrows or drops.

Figure 5:
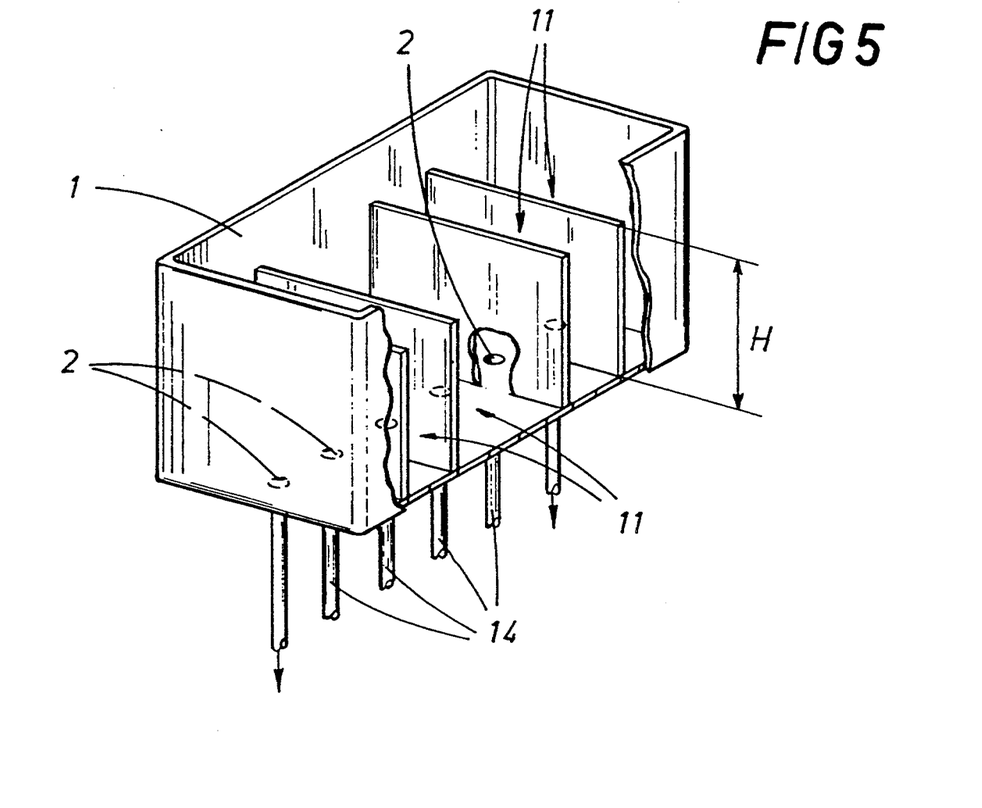
FIG. 5 is a perspective view, with some parts removed to better show others, of a distributing container according to the invention.

Above the holes 2 of the container 1 a plurality of superiorly-open cells 11 can be provided which subdivide the lower portion by a height H greater than that reached by a quantity of water equal to the volume of the bath 3 (and in any case by a height such as to permit the emptying and filling movements of the bath 3). The cells 11 subdivide the volume of water into corresponding smaller volumes, each of which serves a vase 13 communicating with a hole 2 by a hose 14. In FIG. 5 such a subdivision is illustrated, wherein in an embodiment different from that of the other Figures, a container 1 not provided with the bath 3 is sectioned horizontally at a greater height than that reached by the cells 11.

The cells 11 illustrated in FIG. 5 have different volumes according to the different quantities of water to be provided, but could have the same volume, if it is necessary to feed equal quantities of water to different plants.

What is claimed:

1. An improvement in a controlled irrigation device for plants which receives water from a source comprising:
    a water container having a plurality of water outlet holes in a base;
    a bath having an open side with a rim therearound for receiving water;
    means for pivotably mounting said bath on a horizontal axis internally of the container, the bath mounting axis forming a center of gravity for the bath with its open side facing upwardly when the bath is empty;
    means for regulating a delivery rate of water from the source to supply to said bath having an outlet opening located above the open side of the bath;
    said means for mounting said bath maintaining the bath in a position with its open side facing upwardly to receive water from the regulating means outlet until water reaches a level above said horizontal axis and the bath is rotated with its open side facing downwardly to unload the water into the container;
    a rod having an end connected to the bath and having a smaller cross-section than said regulating means outlet opening and being slidable therein as the bath rotates to prevent a build-up of residues deriving from water-borne impurities at the outlet opening;
    said means for regulating comprising:
        a chamber mounted to the container and having an inlet opening for connecting to said source and said outlet opening for allowing water to flow into the bath;
        a floating piston having a smaller horizontal surface than a minimum internal horizontal section of the chamber which is vertically movable internally of the chamber;
        means for preventing said piston from moving above determined heights between the inlet opening and the outlet opening to establish and regulate a water head in the chamber;
        a stiffened end of a first water supply pipe opposite an end of said pipe which is to be connected to the water source extending into said chamber and facing the upper face of said floating piston and functioning as a striker to stop upwards vertical movement of said floating piston caused by an upwards-pushing force exerted by the water head volume in the chamber.

2. An improvement as in claim 1, wherein the rod is connected to a deformable support mounted to one of the container and the chamber for interacting with said bath when it is rotated; said support being movable between a first position at which it is subject to the force of its own weight and the rod is external to the outlet opening and a second position at which it is subject to a thrust by the bath and the rod is inserted in said chamber outlet opening to move the rod in alternating motion relative to said outlet opening upon filling and emptying of the bath.

3. An improvement as in claim 1, wherein the bath is connected to the container by a fork having support points on said bath horizontal axis and an attachment point connected to one end of said rod, said rod being slidable within said outlet opening and an elastic member connecting another end of said rod to said chamber to provide an opposite elastic reaction to a weight force exerted downwards by the bath when full, said rod being subject to alternating motion at fillings and at emptyings of the bath.

4. An improvement as in claim 2, wherein the stiffened end of the water supply pipe within said chamber includes means for vertically positioning said stiffened end at a selected height within the chamber.

5. An improvement as in claim 4, wherein said means for vertically positioning comprises a seating having a through-hole which is substantially equal to an external transverse section of said water supply pipe end and provides a sealed passage for sliding of said pipe end.

6. An improvement as in claim 3, wherein said elastic member comprises a flexible metal sheet connected at one end to a fixed point on one of said chamber and said container and at its other end to the rod.

7. An improvement as in claim 3, wherein said elastic member comprises a spring acting between a part of the fork and a fixed point on one of said chamber and said container.

8. An improvement as in claim 1, further comprising means forming a plurality of cells each with one open top on the container base and each cell associated with at least one of said holes, to subdivide the volume of water in the container into smaller volumes to be directed to individual vases in communication with the holes.

9. An improvement as in claim 1, wherein the floating piston has a striker element at a point where contact is made with the end of the water supply pipe, said striker element being of an elastically compression-deformable material to adhere to the opening at the end of said water supply pipe to prevent an unwanted outflow of water from the supply pipe.

10. An improvement as in claim 3, wherein the end of the water supply pipe within said chamber includes means for vertically positioning said end at a selected height within the chamber.

11. An improvement as in claim 3, wherein said vertical positioning means comprise a seating having a through-hole which is substantially equal to an external transverse section of said water supply pipe end and provides a sealed passage for sliding of said pipe end.

12. An improvement as in claim 4 further comprising a graduated scale of height reference on said chamber to measure the pipe end vertical positioning.

13. An improvement as in claim 8 wherein the total volume of the cells is greater than the volume of water of said bath.

14. An improvement as in claim 10 further comprising a graduated scale of height reference on said chamber to measure the pipe end vertical positioning.

* * * * *

UNITED STATES PATENT AND TRADEMARK OFFICE
CERTIFICATE OF CORRECTION

PATENT NO. : 5,415,347
DATED : May 16, 1995
INVENTOR(S) : Pietro NEGRONI

It is certified that error appears in the above-indentified patent and that said Letters Patent is hereby corrected as shown below:

Title page, item 30, Foreign Application Priority Data, change "B093U0093" to --B093U 000093--.

Signed and Sealed this

Twenty-fifth Day of July, 1995

Attest:

BRUCE LEHMAN

Attesting Officer  Commissioner of Patents and Trademarks